UNITED STATES PATENT OFFICE.

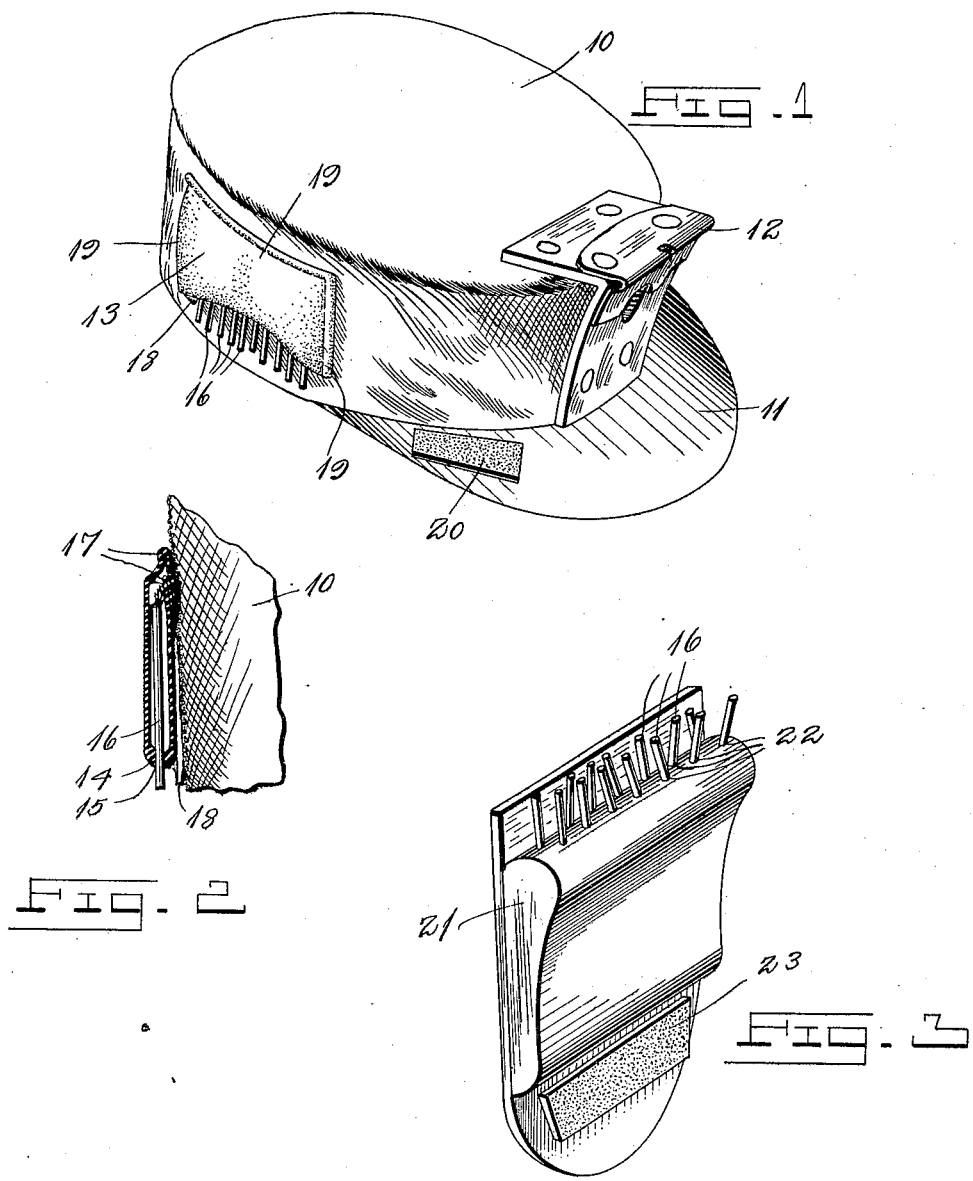

PATRICK R. BURNS, OF SODDY, TENNESSEE.

MATCH-HOLDER FOR CAPS.

1,085,847.  Specification of Letters Patent.  Patented Feb. 3, 1914.

Application filed March 14, 1912. Serial No. 683,875.

*To all whom it may concern:*

Be it known that I, PATRICK R. BURNS, a citizen of the United States, residing at Soddy, in the county of Hamilton, State of Tennessee, have invented certain new and useful Improvements in Match-Holders for Caps; and I do hereby declare the following to be a full, clear, and exact description of the invention, such as will enable others skilled in the art to which it appertains to make and use the same.

This invention relates to match holding devices and more especially to a device adapted for attachment to a cap.

The primary object of the invention is to construct a match holder especially adapted for use by miners, the same being formed of a section of rubber having openings therethrough whereby when the matches are inserted head first through said openings, said material will close upon the stems of the matches and thus protect the heads from dampness which would otherwise render them useless.

With the above and other objects in view, the invention consists of certain other combinations and arrangements of parts as will be hereinafter more fully described, claimed and illustrated in the accompanying drawings, in which:

Figure 1 is a perspective view of a cap having my improved match holder secured thereto. Fig. 2 is a sectional view of the holder and a portion of the cap. Fig. 3 is a detail view of a modified form of holder.

Owing to the fact that great difficulty has been heretofore experienced by miners and those employed in similar work, in retaining matches in a dry condition, by reason of the fact that the heads of the matches are affected by the damp and gaseous atmosphere which renders them useless, serious accidents have resulted by not having matches at hand which would ignite.

The present device is adapted to overcome these objections, being constructed for use by miners for lighting their lamps and also for use by workmen or those employed in outside work, so as to protect the matches against perspiration, the device providing means for retaining the matches in a perfectly dry condition.

In carrying my invention into practice, I have shown the same applied to a miner's cap indicated by the numeral 10, the same having a peak or visor 11 attached thereto and provided with the usual lamp supporting member or bracket 12.

My improved match holder is indicated by the numeral 13 and comprises a section of rubber or other water proof material which is folded upon itself as shown at 14, such folded portion being thicker than the remaining portions of the holder and having a plurality of openings 15 therethrough for receiving the matches 16 head first. The openings or holes 15 are preferably two-thirds of the diameter of the matches and when the latter are inserted in position, the flexible material will close tightly around the matches outwardly of the head, and thereby prevent the entrance of air or atmosphere to dampen the matches.

The sections of material forming the holder at its free edges are turned upon themselves as shown at 17 and the ends of the sections are similarly formed as shown at 18 and secured to one side of the cap as shown at 19 so that the openings will be disposed downwardly and the ends of the matches will project a sufficient distance to be conveniently caught hold of and withdrawn.

In order to provide for the ignition of the matches, the peak or visor 11 has a section of sand-paper or other similar material 20 secured thereto, preferably at one side adjacent the holder and it will be observed that it will require a very short time for igniting the matches and thus the heads of the matches will not have opportunity to become damp before ignited.

In Fig. 3 of the drawings a device is shown adapted for use by workmen, to protect the matches from rain or perspiration and in this form the device is indicated by the numeral 21 being also constructed of rubber and provided with a plurality of openings 22 two rows of such openings being preferably provided and it will be further observed that the device is substantially in the form of a pocket while the lower portion of the device carries a scratching section or strip 23 secured thereto.

It will thus be seen that I have provided a match holding attachment adapted for caps or other service which will positively retain the matches in the proper condition for use and by protecting the same against dampness, will serve to overcome the difficulties and objections as heretofore pointed out.

The thickened portion 14 of the holder is preferably at least one-fourth of an inch thick and by this construction, the matches are prevented from knocking against each other.

I claim:

A match holder consisting of a sheet of flexible material having a thickened portion with openings therethrough, said material being doubled at the thickened portion whereby the free edges may be anchored and whereby a pocket is formed to close on the match stems inserted head first and prevent displacement thereof.

In testimony whereof, I affix my signature, in presence of two witnesses.

PATRICK R. BURNS.

Witnesses:
D. M. ELLIOTT,
HAYDEN MORGAN.

Copies of this patent may be obtained for five cents each, by addressing the "Commissioner of Patents, Washington, D. C."